UNITED STATES PATENT OFFICE.

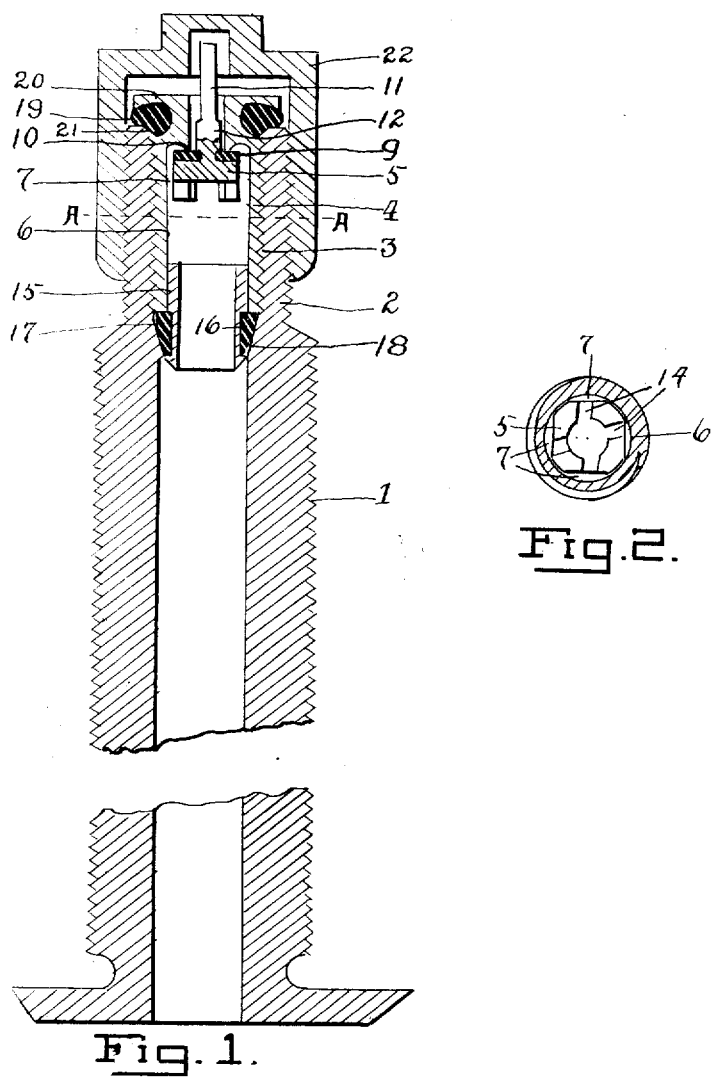

ALBERT L. KULL, OF NEW ROCHELLE, NEW YORK, ASSIGNOR TO DOUBLE SEAL TIRE VALVE CO., OF NEW YORK, N. Y., A CORPORATION OF DELAWARE.

TIRE-VALVE.

1,133,042.  Specification of Letters Patent.  Patented Mar. 23, 1915.

Application filed January 9, 1915. Serial No. 1,412.

*To all whom it may concern:*

Be it known that I, ALBERT L. KULL, citizen of the United States, and resident of New Rochelle, in the county of Westchester and State of New York, have invented certain new and useful Improvements in Tire-Valves, of which the following is a specification.

The object of my invention is to reduce the cost of construction of tire valves, to increase their efficiency in operation and to reduce leakage which is such an ever present factor, particularly after valves have been opened a few times for repair.

A further object is to attain these ends without in any way making it more difficult to separate the parts for cleaning or repair purposes.

Figure 1 is a sectional elevation, enlarged of a form of my tire valve. Fig. 2 is a cross section of the valve socket upon the line A—A Fig. 1 looking upward.

My invention is adapted to be used with the ordinary stem 1 well known in the art. In the reduced portion 2 of such a stem or its equivalent and preferably secured therein by means of screw threads 3 is a valve socket 4 containing a valve 5 adapted to prevent the escape of air from the interior of any tire, which may be attached to the stem in well known ways.

The valve 5 is shown in bottom view in Fig. 2 and is shown to be square, the corners rounded off to fit the interior bore of the cylinder 6 in such a way that the valve 5 is guided in the cylinder and yet has free spaces 7 for the passage of air around the valve. Many other shapes may be employed to get the same result. The valve 5 has a soft rubber or other packing 9 adapted to press against the seat 10 of the socket, making an air tight joint. The pin 11 of the valve has an enlargement 12 to secure the packing 9 and prevent it from being pulled away from the valve 5 when the valve opens the passage through the hole 13 as the tire is being pumped up. The valve 5 may also have cut out portions as shown at 14 for the purpose of being manipulated by a screw driver or corresponding tool, when necessary to separate a sticking valve from its seat.

Pin 11 of the valve projects above the top of the socket so that it may be depressed by the finger to open the valve for the purpose of deflating. To prevent the valve from dropping out of the bottom of the socket a plug 15 is driven into the lower end of the socket 4. The plug is provided with an annular groove 16 carrying a packing 17 of rubber or other suitable material adapted to be seated against the conical seat 18 in the stem 1. This renders the joint air tight. An additional packing 19 is employed of soft flexible rubber. This may be a flat washer and the head 20 of the socket may be hollowed out as shown with the result that when the socket is screwed down into its proper position, the washer is compressed against the exterior surface of the socket and the top of the stem 2 as shown. A bevel or inclined surface 21 in the top of the stem may also be provided and the rubber packing may be compressed against it as the socket is screwed into position thereby making the valve air tight. Any suitable cap 22 may be screwed onto the exterior of the reduced portion 2 of the stem to protect the parts from injury.

In my socket, I prefer to use no springs to hold the valve 5 against its seat, my object being to have the valve entirely free to open and close and get the maximum amount of air at each stroke of the pump thereby making the valve faster in its operation, thereby enabling the valve to permit the passage of a given volume of air in a shorter space of time.

I claim—

1. In a tire valve, in combination, a valve stem having threads or their equivalent upon its interior wall, a valve socket screwed therein having an enlarged end projecting from said stem, two separate packings between said socket and stem, one at the outer end of said stem and one between the exterior wall of said stem and the interior wall of said stem and a valve proper located in said socket.

2. In a tire valve for a stem having screw threads upon its interior wall, a socket having a projecting end larger in diameter than said screw threads, a packing between said projecting end and the end of said stem, screw threads upon said socket adapted to fit the threads in said stem, a packing on said socket below said threads to fit against the interior wall of said stem, a valve chamber within said socket and between said packings, a seat in said chamber and a valve proper adapted to engage said seat.

Signed at New York in the county of New York and State of New York this 7th day of January, A. D. 1915.

ALBERT L. KULL.

Witnesses:
MYRON F. HILL,
GERTRUDE M. HILL.

It is hereby certified that in Letters Patent No. 1,133,042, granted March 23, 1915, upon the application of Albert L. Kull, of New Rochelle, New York, for an improvement in "Tire-Valves," an error appears in the printed specification requiring correction as follows: Page 1, line 96, claim 1, for the word "stem" read *socket;* and that the said Letters Patent should be read with this correction therein that the same may conform to the record of the case in the Patent Office.

Signed and sealed this 3d day of April, A. D., 1917.

[SEAL.]

F. W. H. CLAY,

*Acting Commissioner of Patents.*

Cl. 152—12.